US005983474A

United States Patent [19]

Koppe

[11] Patent Number: 5,983,474

[45] **Date of Patent: *Nov. 16, 1999**

[54] PULLER TOOL

[76] Inventor: Rudolf Koppe, 1251 Britannia Rd., Campbellville, Ontario, Canada, L0P 1B0

[ * ] Notice: This patent is subject to a terminal disclaimer.

[21] Appl. No.: 08/867,182

[22] Filed: Jun. 2, 1997

Related U.S. Application Data

[63] Continuation-in-part of application No. 08/810,349, Mar. 3, 1997, Pat. No. 5,819,386.

[51] Int. Cl.[6] ........................ B23P 19/04

[52] U.S. Cl. ........................ 29/261

[58] Field of Search ........................ 29/261, 260, 262, 29/259, 258

[56] References Cited

U.S. PATENT DOCUMENTS

| | | | |
|---|---|---|---|
| 4,437,654 | 3/1984 | Chiappetti | 269/283 |
| 5,341,553 | 8/1994 | Herzhauser | 29/261 |

*Primary Examiner*—Robert C. Watson
*Attorney, Agent, or Firm*—Crossetta & Associates

[57] ABSTRACT

This invention relates to an improved puller, wherein notch and slot means are arranged for adjustably engaging a mating slot and shoulder of gripping jaws to provide improved resistance to wear and misalignment through use, and reversible jaws enable adaption of use to removal of seals and the like from housings.

24 Claims, 5 Drawing Sheets

PULLER TOOL

This application is a C.I.P of Ser. No. 08/810/349 filed Mar. 3, 1977 now U.S. Pat. No. 5,819,386.

This invention relates to an improved puller for the removal of parts which may be jam fitted to shafts, housings and the like. In a preferred embodiment the improved puller is particularly suitable for the removal of flexible impellers from a shaft of a water pump, and is adaptable for the removal of ring seals, bearings and the like fitted to housings for sealing shafts extending therethrough.

BACKGROUND OF THE INVENTION

Many mechanical assemblies comprise an arrangement wherein a rounded shaft is jam fitted with a component such as a bearing, impeller, gear, wheel or the like, which is mounted to rotate with the shaft. Similarly, many mechanical assemblies comprise arrangements wherein a component such as a bearing, race, seal or the like is jam fitted around its periphery to an opening in a housing, usually to encircle a shaft or the like extending through the opening of the housing. Typically the removal of such components from a shaft and/or housing for repair or replacement is problematic and requires use of a puller or the like tool.

For example, liquid cooled internal combustion engines are commonly designed to incorporate water pumps as an integral part of the engine and/or drive train. Particularly in marine engine embodiments, the water pump generally comprises a flexible impeller of varying size, dimensions and number of blades. The impeller generally comprises a plurality of slightly resilient curved arms arranged as spokes around a metal hub, the hub having a central opening for mounting to a shaft which rotates the impeller.

It is not unusual for such impellers to be removed for replacement and/or repair, with removal being generally time consuming because of the close tolerance positioning of the water pump on the motor, the positioning of the motor in the vehicle and/or boat, the jam fit by which the hub of the impeller is typically mounted to a water pump shaft and/or the effects of corrosion, dirt and the like among the shaft and the impeller. It is not unusual for a technician to be forced to use a pair of flat screw drivers to slowly pry the impeller from the shaft, creating the danger of damage to the housing and in many instances so damaging the impeller and/or housing as to make it non-repairable, non-rebuildable or even nonreusable once removed.

Similarly, many motors and/or machines generally comprise a rotatable shaft extending through an opening in a housing, with the housing comprising a bearing and/or seal which is jam fitted therein, the bearing or seal generally has a peripheral rigid collar for jammed retention to the housing and an interior facing elastomeric and/or machined surface for engaging the shaft and preventing leakage of fluids. When such seals or bearings need replacement it is not unusual for a technician to be forced to use a hammer and chisel or the like tools to force the seal or bearing from its fitted position, usually at the risk of damaging the component and/or the housing.

Various pullers have been proposed for use in removal of components from their supporting shaft but each have limitations in use. U.S. Pat. No. 5,341,553 discloses puller particularly suitable for pulling impellers from water pumps of marine engines, which purports to solve the problem of flexible impeller removal from water pump shafts, but has been found problematic in that it is easily misaligned and can cause damage to the impeller and even further jam the impeller on the shaft and make the removal process more difficult and even technically illusive to a technician.

It is a primary object of the present invention to provide an improved puller which will facilitate the removal of components from shafts and housings.

It is a further object of the invention to improve the impeller puller of U.S. Pat. No. 5,341,553 to resolve the difficulty encountered with misalignment during removal of flexible impellers and make it adaptable to pulling seals or the like.

It is another object of the invention to provide a universal puller which is more easily aligned and more certain in operation for the effective removal of a flexible impeller with minimal damage to the impeller.

It is still another object of the invention to provide an improved puller which can be conveniently adapted for pulling components from a shaft and/or from a housing surrounding an opening.

These and other objects of the invention will become apparent in the following recitation of the invention.

SUMMARY OF THE INVENTION

The present invention comprises an improved puller which has universal application and has particular application for uses disclosed in U.S. Pat. No. 5,341,553 in the removal of flexible impellers of varying dimension and number of blades, and is easily adaptable for removal of multiple various other components from shafts and/or from housings.

The adjustable puller generally comprises a linkage head which has an axial threaded bore extending through it along a center axis and generally coplaner platforms arranged at opposite sides of the bore for mounting clamping members. An elongate screw member is threaded to mate with the threaded bore for adjustable positioning through the linkage head.

Clamping members, are positioned at about the platforms on either side of the linkage head and are arranged to be moveable toward and away from the center axis of the bore in about a common plane which extends generally through about the center axis. Elongate gripping jaws are mounted to the clamping members either directly, or indirectly through linking members, to the clamping member. The gripping jaws are configured to extend lineally in the direction of the center axis of the bore and have at least one and generally a plurality of gripping elements along their length to a distal end. The gripping elements extend about laterally to the lineal direction of the center axis.

Two sets of two opposing elongate linking members, are pivotally mounted at their ends in spaced quadrilateral relationship between either a clamping member and its respective gripping jaw or a clamping member and its respective mounting platform. The linking members are arranged to enable movement of the gripping jaw lineally along the center axis and contemporaneously therewith, enable movement laterally toward and away from the center axis by pivot movement of the quadrilateral from an open, about right angle relationship of the quadrilateral sides to a closed obtuse angled relationship, with the engaging elements of the jaw maintaining a generally consistent angle of engagement with the component to be removed.

In a first embodiment, the puller of the present invention comprises a centrally disposed linkage head, having a threaded axial bore therethrough for mounting an elongate threaded screw member along its central axis and generally coplaner platforms arranged at opposite sides of the bore generally parallel to the central axis. First and second "L" shaped clamp members, comprising first and second legs constituting an "L" shape, are disposed along opposite sides of the linkage head, each clamp member being hingedly secured along a first leg to a corresponding mounting platform of the linkage head by two sets of two opposing elongate link members. The link members are positioned such that each of the second legs of the first and second clamp members are hingedly movable between a retracted and clamped position.

Each of the second legs of the first and second clamp members comprise a slot along about their length for directly mounting an end of a mating slotted and shouldered gripping jaw and providing at least two shoulders on the gripping jaw for engaging mating shoulders of the second leg of a clamp member for slidably mounting the gripping jaw, adjustably along about the width of the second leg for adaptability to a greater variety of sized components to be removed.

Adjustable mounting of the gripping jaw to the clamp members is preferably by screw means, engaged through a plurality of holes arranged along the length of the second leg of the clamping members, which further engages one or more threaded hole in the end portion of the gripping jaw. In a preferred arrangement, the slots in both the gripping jaw and the clamping members are machined to close mating tolerance to enable close fitted shoulder engagement of the end portion of the shoulders of the gripping jaw to the shoulders of the second leg of the clamping member along the length of the second leg. The threaded hole or holes of the end portion of the gripping jaw are generally positioned away from a center axis of the gripping jaw and toward a center axis of the linkage head, e.g. the central axis of the device.

In another embodiment of the invention "L" shaped clamp members are arranged contiguous with the opposite sides of the linkage head to enable a first leg of the "L" shape, with the second leg extending along about the center axis of the bore. The gripping jaws are hingedly mounted to the second leg of the clamp member by means of two sets of two opposing elongate link members, positioned such that each of the gripping jaws are hingedly movable between a retracted and clamped position.

In a variation of such embodiment the clamp members are separate components which are removably, rigidly mounted to opposite mounting platforms of the linkage head, the first leg of the clamping member arranged as an elongation of the linkage head. In another variation, the elongate link members are removably mounted to the second leg to enable reversal of the direction of the gripping jaws from gripping elements facing toward the central axis of the bore to facing outward from the central bore.

In still another embodiment of the invention the linkage head is elongate, with the axial bore being arranged about perpendicular to the elongate axis of the linkage head, and first and second opposing mounting slots comprising the mounting platforms, being arranged about perpendicular to the axial bore extending toward opposite distal ends of the linkage head. Clamp members are enabled for adjustable mounting along the opposing mounting slots in an arrangement so as to provide an adjustable "L" shape, with the elongate linkage head comprising a first leg of the "L" shape and the clamping member mounted thereto comprising a second leg of the "L" shape. The gripping jaws are hingedly mounted to the clamp members, e.g. the second leg, through two sets of two opposing elongate link members, positioned such that each of the gripping jaws are hingedly movable between a retracted and clamped position.

Each gripping jaw is elongated and comprises gripping elements arranged to engage the component to be removed, at an angle to the central axis of the puller device. A gripping jaw can comprise one or several gripping elements or teeth along its length. In an embodiment for the removal of seals, bearing or the like component from a housing, the gripping jaws are arranged so that gripping elements extend outwardly from the central axis and generally only one of the gripping elements engages the component for removal. Preferably, for removal of flexible impellers, a gripping jaw comprises a plurality of elements arranged along the jaw extending toward an axis of the threaded screw member such that multiple teeth are positioned to engage an elastomeric material comprised on the central hub of a flexible impeller arranged along about a central axis of the device.

In embodiments wherein the elongate linking members are connected among the linkage head and the clamping members, the combination of close mating tolerance among shoulders and slots in the second leg of the clamp member and corresponding gripping jaw end portion, together with off-center mounting screw attachment of the jaws through the holes, provides multiple engaging shoulders for assuring fixed positioning of the jaws in respect to the clamping members, while reducing sheering stress on the mounting screw means which may be occasioned by the forces imposed upon the puller in removal of an impeller or other component from a shaft.

In other embodiments wherein the gripping jaw is mounted to the link members, embodiments are also contemplated wherein the gripping jaw comprises an assembly of a jaw base and gripping jaw end portion, the jaw base engaging the elongate linking members and having a close mating tolerance shoulder arrangement for adjustable attachment of the gripping jaw portion.

In still other embodiments, the clamping members are adapted for reversible mounting in a slot or either opposing slot, thus enabling reversal of the gripping jaws from gripping elements extending in a direction toward the central axis to a direction extending away from the central axis. When mounted in a direction toward the central axis the gripping jaws enable the removal of components from a shaft. When mounted in a direction away from the central axis the gripping jaws enable the removal of seals, bearings, races and the like from a housing.

In the puller of the present invention, the elongate screw member engages a lever point, generally the center point of a shaft end or the like on which the component is mounted or a central shaft or center point on a spanning fixture when a component is mounted to an opening of a housing, and the linkage head is forced axially along an axis of the lever point away from the lever point. Gripping elements of the gripping jaws engage the component and as the linkage head is forced axially along the axis, the gripping jaws simultaneously axially pull the component while increasingly compressing against the component through the rectilinear arrangement of the link members. Thus, the greater the resistance of the component to being removed, the greater the grip on the component by the puller.

As the grip increases, sheer forces perpendicular the longitudinal axis of the gripping jaw increase and variations in tolerance at mounting points which provide play in the movement of the gripping jaw are exacerbated along the length of the gripping jaw. As the sheer force increases, the point along the jaw at which compression toward the component being removed is greatest, moves from gripping elements contacting the component at the extreme end of the jaw, toward gripping elements contacting the component nearest the clamping member. In the same manner, the point along a hub of an impeller at which greatest pulling force is being exerted is the point of greatest gripping force and thus as the gripping force moves toward the clamping member the greatest pulling force exerted upon the hub moves toward the exterior end of the component and away from the interior end of the hub.

The result is that in prior art impeller pullers, teeth or the like means which are arranged to press into a resilient surface of the hub closest to the exterior end of the hub and may pierce the elastomeric covering of the impeller hub and exert a misaligned force on the hub. The misalignment requires greater pulling force than otherwise necessary to remove the hub and typically the teeth arranged at the exterior end of the hub end up ripping away elastomeric material at the exterior end of the hub and the pulling process fails.

In the present invention, the mating slots among the clamping members and the gripping jaws of the first embodiment provide increased surface-to-surface resistance to the sheering force at the mounting of the gripping jaws to the clamping members and the positioning of the screw mounting means mitigates against wear of the screw mounting, occasioned by adjustment changes for varying hub dimensions, becoming a factor in variation of tolerances. Similarly, the defined angle of the plane of the plurality of engaging teeth of the jaws, assures the teeth arranged at the extreme end of the jaws will provide more compression force to the elastomeric covering of the hub at the interior end of the hub than the teeth on the jaws which engage at the exterior end of the hub, thus assuring alignment of the pulling force and assuring reduction of piercing and/or ripping effect on the elastomeric material at the exterior end of the hub.

For a fuller understanding of the nature of the present invention, reference is made to the following detailed description taken in connection with the drawings.

DETAILED DESCRIPTION OF THE INVENTION

Figure 1:
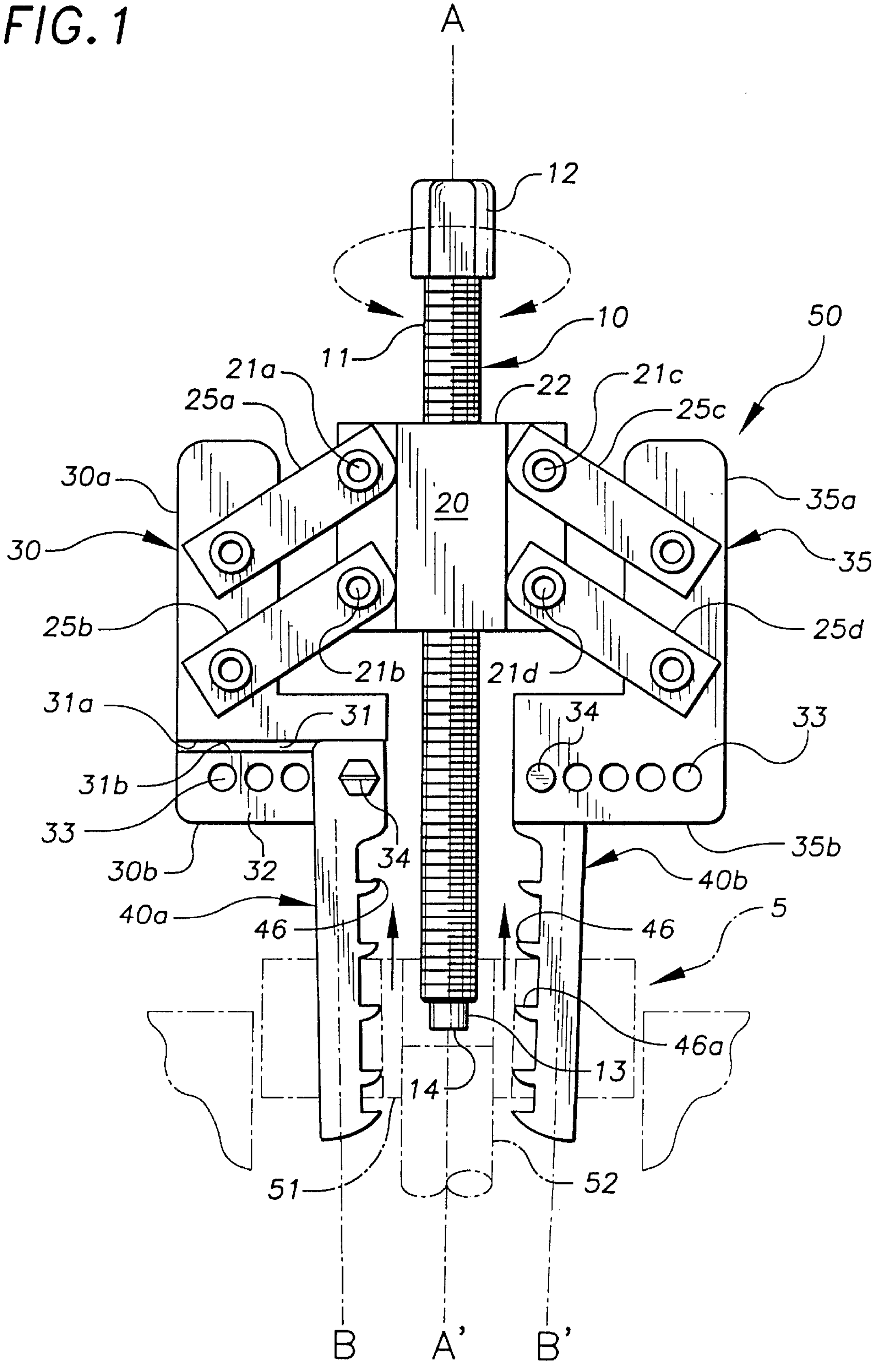
FIG. 1 is a front view of an impeller puller of the invention illustrating positioning when pulling an impeller.
Figure 2:
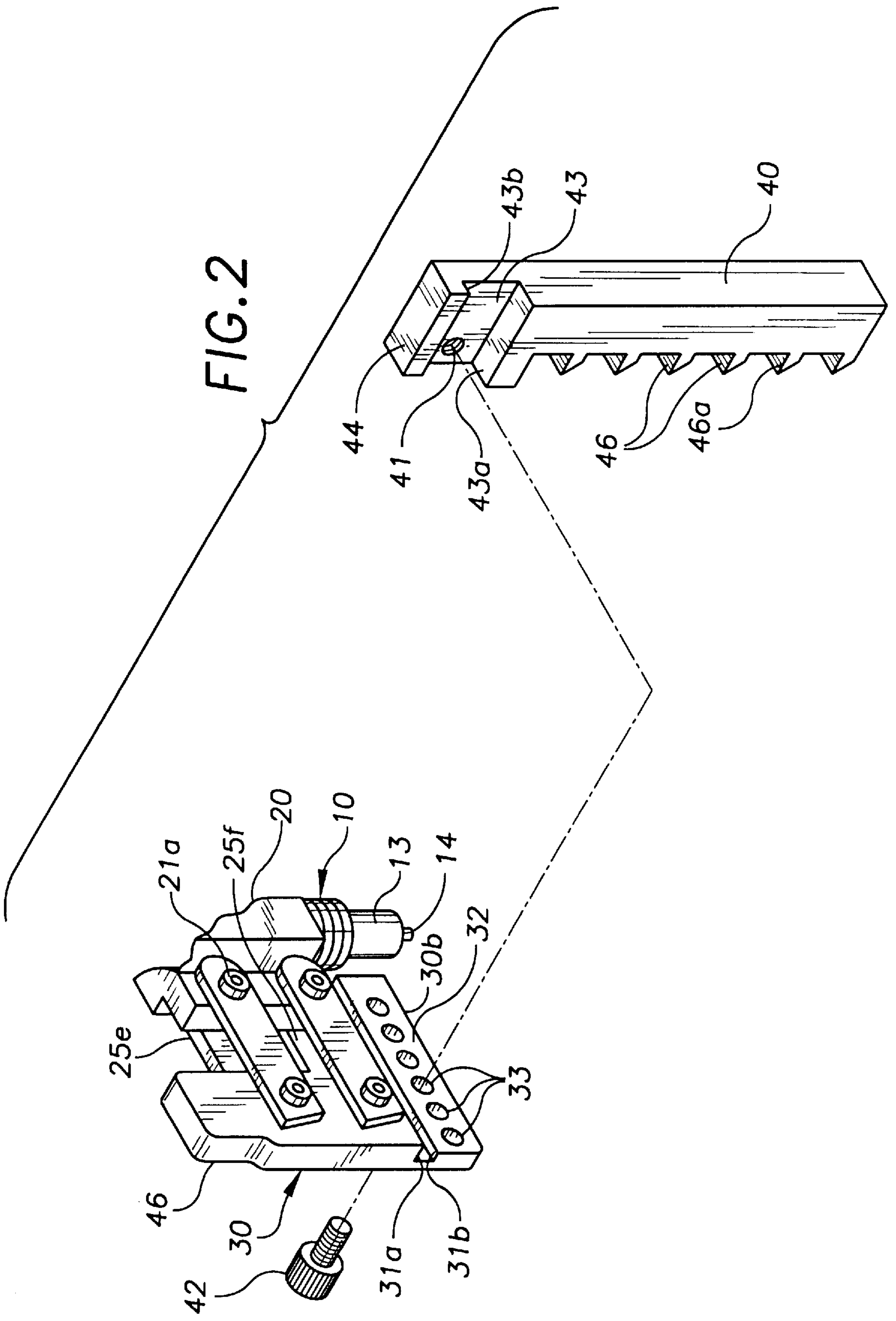
FIG. 2 is a partial, exploded view of an impeller puller of FIG. 1, particularly illustrating attachment of a gripping jaw to a clamping member.

Referring now to the FIGS. 1 and 2, therein is illustrated a puller 50 of the invention, particularly suitable for pulling impellers, comprising a centrally disposed linkage head 20, having a threaded axial bore therethrough 22, for mounting an elongate screw member 10, having threads 11 for adjustably screwing the screw member into mating threads, not shown, in the axial bore of the linkage head. Screw member 10 is illustrated as comprising at its proximal end, an hexagonal head 12 to enable engaging a wrench for rotation of the screw member the like and at its distal end a non threaded end 13 with a center point 14 for engaging and maintaining centered position on an end of a shaft of a water pump.

Elongate link members 25*a–d* are hingedly secured at one end to linkage head 20 by means of pins 21*a–d*. Matching link members 25*e*,25*f*, as shown in FIG. 2, are secured to linkage head 20 on the reverse side of the linkage head by means of pins (not shown) in a mirror arrangement. Clamp members 30 and 35 are illustrated as "L" shaped and including first legs 30*a* and 35*a* and second legs 30*b* and 35*b* respectively. The first legs 30*a* and 35*a* of the clamp members are hingedly secured to link members 25*a–b* and 25*c–d* respectively by means of pins 21*a–d*. Thus can be seen that the link members, clamp members and linkage head are secured in a hinged parallelogram arrangement which enables movement of the clamping members toward and away from the linkage head, e.g. clamping and retracted, while maintaining same in an axis about parallel to the center axis A–A' of the linkage head.

Each of second legs 30*b* and 35*b* of clamp members 30 and 35 respectively comprise stabilizing slot 31 and mounting notch 32 along about their length which create shoulders 31*a* and 31*b*. Mounting notch 32 comprises a plurality of aligned holes 33, for adjustably mounting an end of a mating slotted gripping jaw 40*a* and 40*b*. In FIG. 1, aligned holes 33 are illustrated as threaded with gripping jaws 40*a* and 40*b* being mounted to second legs 30*b* and 35*b* by means of a attachment screw member 34 which engages a mating hole in the proximal end of the gripping jaws and having a threaded end for engaging threaded holes 33. In FIG. 2, aligned holes 33 are illustrated as non-threaded and as mating with threaded hole 41 of gripping jaw 40 and being mounted by threaded screw member 42.

Gripping jaws 40*a* and 40*b* comprise slot 43 which has shoulders 43*a* and 43*b*. When mounted to a clamping member, end 44 of the gripping jaw slidably engages shoulder 31*a* of slot 31 of the clamping member, shoulder 43*b* of the gripping jaw slidably engages shoulder 31*b* of the clamping member and shoulder 43*a* of the gripping jaw slidably engages the butt end of leg 30*b*, providing three generally flat engaging surfaces to receive and resist the sheering force created during the pulling process. The attachment screw member acts primarily to retain the shoulders in mating alignment and not in resisting sheering force, thus significantly extending the usable life of the puller.

In the puller of the invention, the engaging end of the teeth on a gripping jaw are arranged in a straight line, which is aligned at an angle to the centerline of the puller. In FIG. 1, this is illustrated by centerlines B and B' of the jaws being angled to centerline A–A' of screw member 10 and teeth ends 46 being equidistant from centerlines B and B'. Further, upper surface 46*a* of the teeth is preferably aligned at an angle from the perpendicular of the centerline A–A' of the puller. Generally, the angle of a straight line along the ends of the teeth to centerline A–A' is about 1 to about 10° and preferably from about 1 to about 7°. The angle of upper surface 46*a* is about 1 to about 15° and preferably about 1 to about 10° from the perpendicular to centerline A–A'.

In a preferred arrangement of the invention, the link members, clamp members and linkage head are secured in a hinged parallelogram arrangement which enables movement of the clamping members toward and away from the linkage head, e.g. a clamping and retracted position, while maintaining essentially the same relative relationship of the axes of both the clamping member and gripping jaws to the center axis A–A' of the linkage head. The central axis of the gripping jaws may be parallel or angled from center axis A–A' but the ends of the teeth must be in an alignment which is at an angle to the center axis A–A'. In a preferred embodiment the central axis of the gripping jaws is angled from center axis A–A' and the ends of the teeth are aligned parallel to the center axis of the gripping jaws. In a preferred embodiment, the upper surface of the teeth extend along a line about perpendicular from an angled centerline of the gripping jaws, with the bottom surface being beveled at from about 20 to about 50 degree angle, preferably about 25 to about 45 degrees to the upper surface to provide an edge at the end of the tooth. In a preferred embodiment seven teeth are provided with their ends being from about 8.5 to about 9.5 mm apart.

FIG. 2, illustrates a preferred embodiment comprising a rounded notch 46 along leg 30*a* and 35*a* (not shown) of clamping members 30 and 35(not shown). Such notch enables convenient gripping of the puller by the technician during installation and removal of the puller.

In operation, the gripping jaws 40*a* and 40*b* are arranged to straddle the hub 51 of impeller 50, with center point 14 engaging a center notch in the water pump shaft 52. Screw member 10 is turned to engage a pulling force and extract the impeller from the shaft.

Figure 3:
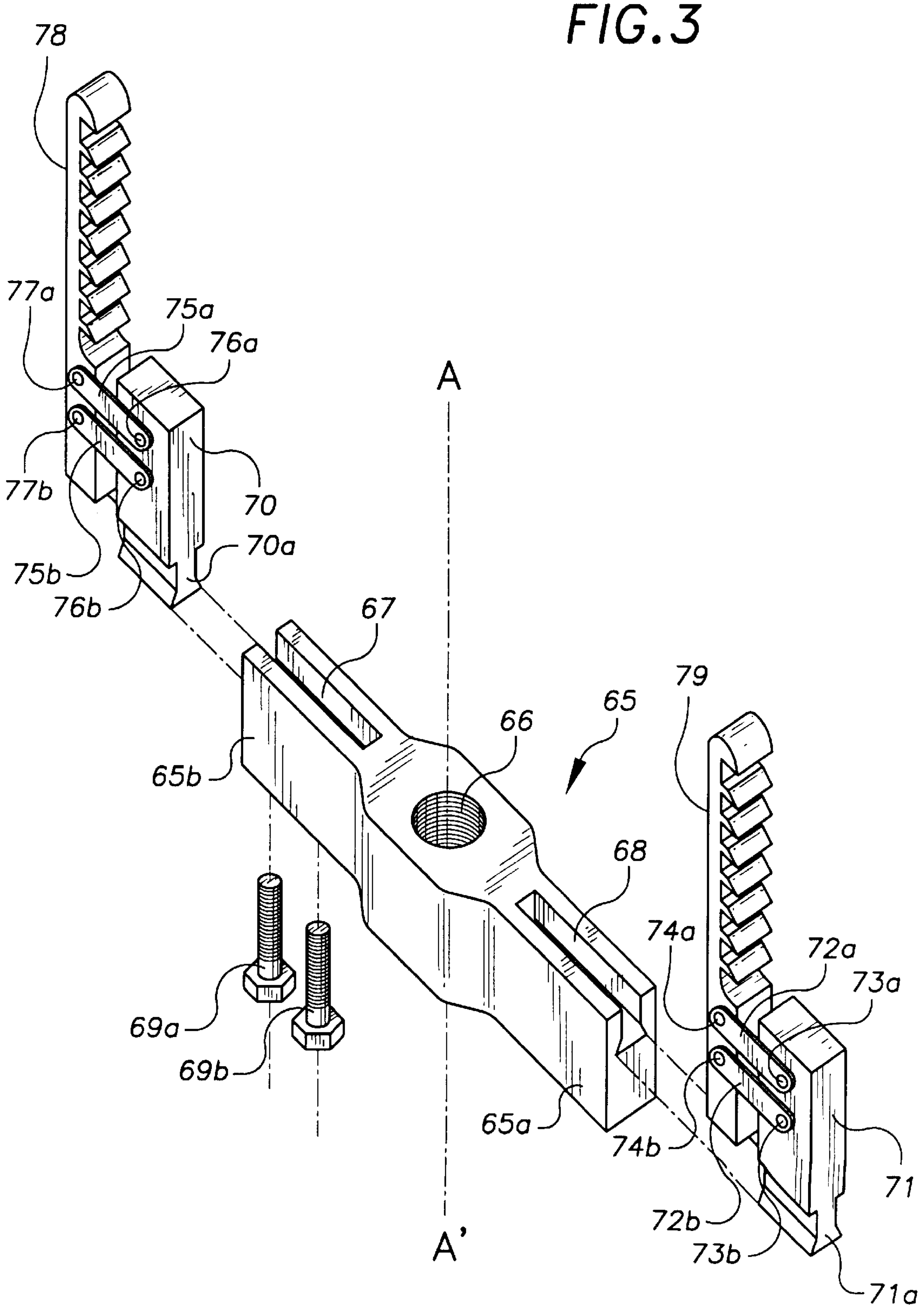
FIG. 3 is an exploded, perspective view of another embodiment of the puller of the invention.

FIG. 3, illustrates a puller of the invention which is particularly adaptable for pulling various components from a shaft and the removal of seals, bearings, races and the like from a housing. Therein elongate linkage head 65, is illustrated having a threaded axial bore therethrough 66, for mounting an elongate screw member (not shown) and opposing platforms comprising slots 67 and 68 for mounting clamp members 70 and 71. Slots 67 and 68 are illustrated as being dove tailed and extending from distal ends 65*a*, 65*b* of linkage head 65 toward the central axial bore. Clamp members 70 and 71 are illustrated as being dove tail shaped at their mounting ends 70*a* and 71*a*, in a configuration suitable for reversible slidable mounting engagement along slots 67 and 68 respectively, with clamp member 71 being illustrated in reversed arrangement for seal or the like removal from a housing. Set screws 69*a*,69*b* illustrate means for positive fixed positioning of the clamp members along slot 67, with slot 68 comprising the same or different means (not shown). It should be understood that various configurations of slots 67 and 68 and ends 70*a* and 71*a* are contemplated by the invention, as suitable to enable slidable mounting of mounting clamps to the elongate linkage head and the invention is not limited to the preferred dove tail arrangement.

Elongate link members 75*a–d* are hingedly secured, in mirror arrangement, at one end to clamp member 70 by means of pins 76*a* and 76*b*, and at their other end to gripping jaw 78 by means of pins 77*a* and 77*b*. Similarly, elongate link members 72*a* and 72*b* are hingedly secured in mirror arrangement at one end to clamp member 71 by means of pins 73*a* and 73*b* and at their other end to gripping jaw 79 by means of pins 74*a* and 74*b*.

The arrangement of clamp members 70 and 71 in mounted relationship to linkage head 65 are illustrated as enabling an "L" shape, with clamp members 70 and 71 comprising first legs and the linkage head from the axial bore to distal ends 65*a*,65*b* comprising the second legs respectively. Thus it can be seen that the link members, gripping jaws and clamp members are secured in a hinged parallelogram arrangement which enables movement of the gripping jaws toward and away from the linkage head, e.g. clamping and retracted, while maintaining the gripping jaws in an axis about parallel to the center axis A–A' of the linkage head. Reversal of the clamp members within the slots reverses the direction of the gripping teeth to an outward direction while maintaining the about parallel nature of the jaws.

As previously discussed, when the clamp members are arranged so that the teeth of the gripping jaw face inwardly, axial pressure by the screw member forces the jaws inward toward the centerline of the shaft. When the clamp members are arranged so that the teeth of the gripping jaw face outwardly, axial pressure by the screw member forces the jaws outward to engage the interior periphery of a seal, race, bearing or the like.

Figure 4:
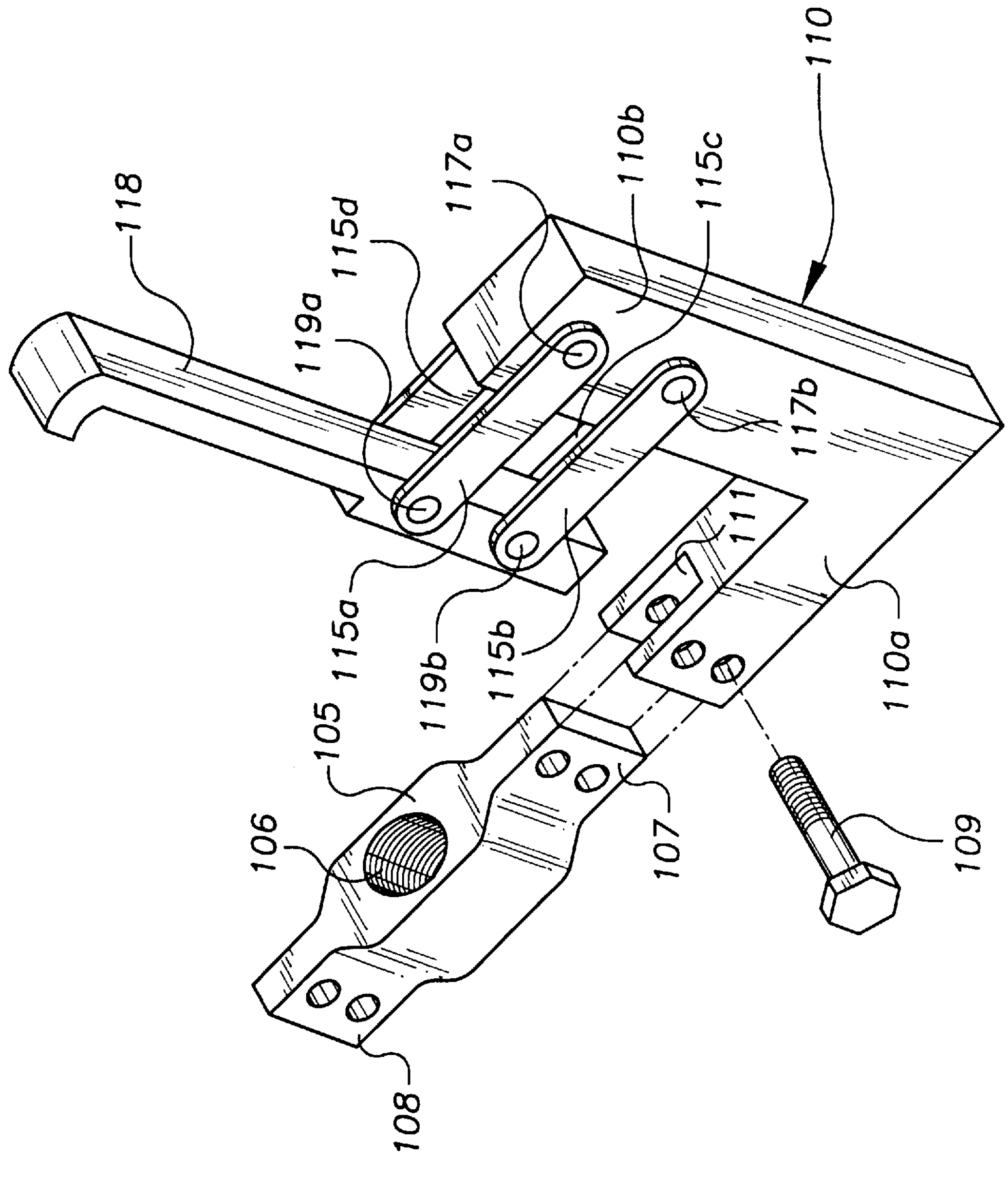
FIG. 4 is a fragmentary, exploded view of still another embodiment of the invention.

FIG. 4, illustrates a further arrangement of a puller of the invention which is also particularly adaptable for pulling various components from a shaft and the removal of seals, bearings, races and the like from a housing. Therein linkage head 105, is illustrated as having a threaded axial bore therethrough 106, for mounting an elongate screw member (not shown) and opposing platforms 107 and 108 for butt mounting first legs of opposing clamp members. Clamp member 110 is shown comprising first leg 110*a* and second leg 110*b* and having a slot 111 which engages mounting platform 107 and is retained in place by bolts 108 and 109(not shown). Elongate linking members 115*a–d* are illustrated as hingedly secured, in mirror arrangement, at one end to second leg 110*b* by means of removable pins, bolts or the like means 117*a* and 117*b*, and at their other end to a gripping jaw 118 by means 119*a* and 119*b*. Reversal of the linking means reverses the direction of the gripping teeth of the gripping jaws to an outward direction while maintaining the about parallel nature of the jaws.

As previously disclosed, in the arrangement of the puller of the invention the axial pressure of the screw member against the shaft forces collapsing and/or opening movement of the quadrilateral, such that the jaws move inward or outward in respect to the centerline providing an improved grip against the component being pulled. Generally, such inward or outward pressure increases with the amount of axial pressure needed to force the component from its seated position. In certain operations, the components are such that the increased inward or outward pressure may damage the component or even create a binding effect which increases the resistance of the component to removal from its seated position, and thus it may be desirable to incorporate a means for limiting the amount of inward or outward pressure imposed by the jaws.

Figure 5:
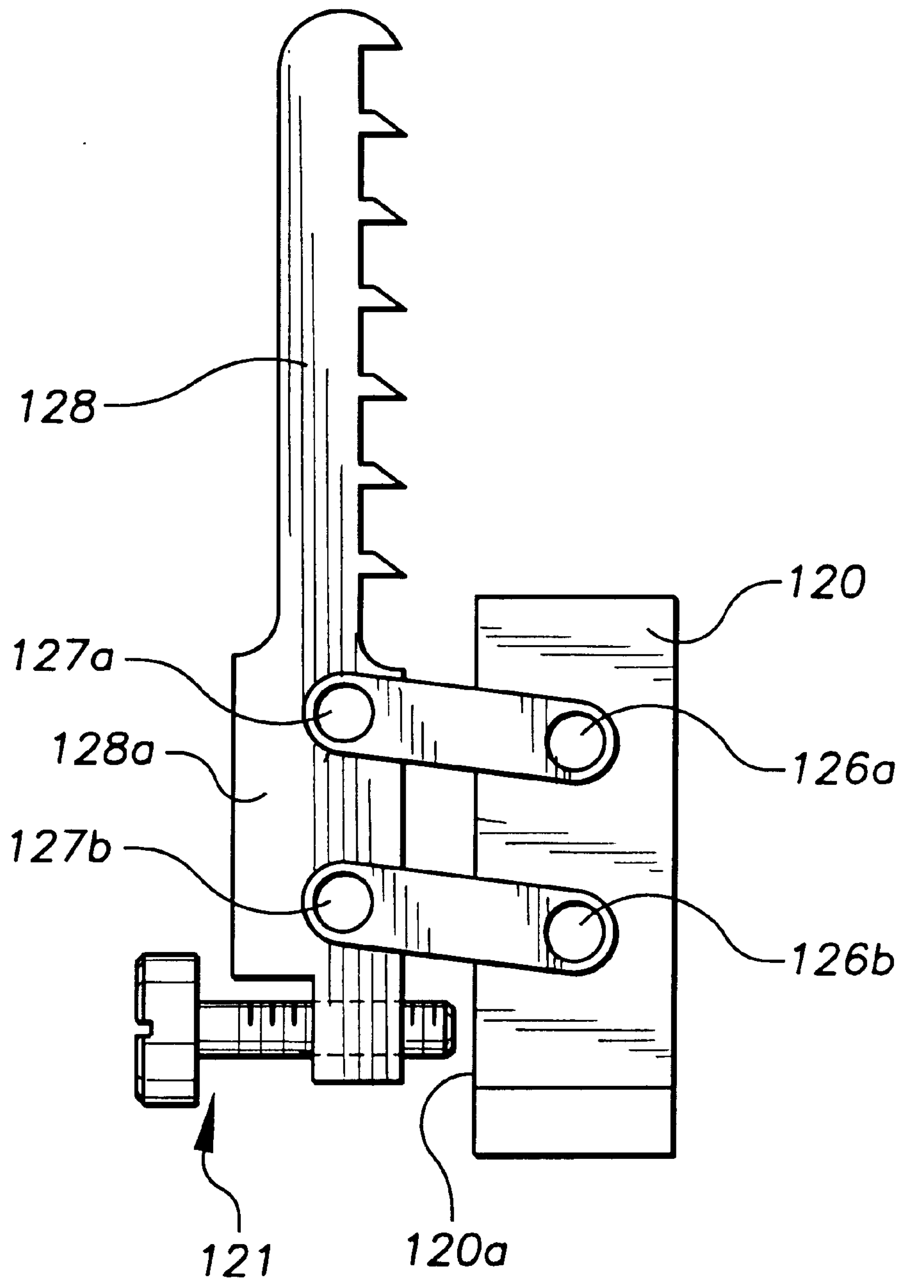
FIG. 5 is a side view of a pressure moderator of the invention.

FIG. 5 comprises a side view of a gripping jaw and clamp member arrangement of FIG. 3 comprising a pressure moderator means operable with the puller of the invention. Therein, elongate link members 125*a* and 125*b* are hingedly secured, in mirror arrangement with link members 125*c* and 125*d* (not shown), at one end to clamp member 120 by means of pins 126*a* and 126*b*, and at their other end to end 128*a* of gripping jaw 128 by means of pins 127*a* and 127*b*. Pressure stop 121 comprises a threaded screw member which adjustable threads into a threaded hole in end 128*a* of jaw 128 in an arrangement providing adjustable engagement with facing surface 120*a* of clamp member 120. In operation, the puller is mounted to the component to be pulled and the central elongate screw member is axially adjusted so that the gripping teeth of the jaw members snugly engage the component to be pulled. At a point of adjustment wherein it is believed that the inward or outward pressure of the jaw on the component is at its desired strength, the pressure stop 121 is adjusted to engage facing surface 120*a* of the clamp member. Adjustment of pressure stop 121 to engagement with facing surface 120*a* stops collapsing/opening movement of the quadrilateral arrangement among the linking members, gripping jaw and clamp member, thus stopping increases of further inward or outward pressure on the component to be removed. Alternately, it is contemplated that an adjustable spacer means may be arranged between the gripping jaws and the central elongate screw member which can be adjusted to resist inward movement of the gripping jaw.

It should be understood that the gripping jaws may be of any convenient length and sizing, and since the device maintains the jaws relatively straight during the pulling process, the puller of the invention is suitable for use in applications wherein the component to be removed is located so distal from the access point as to not even be considered for conventional pullers. Indeed, conventional pullers typically utilize bent arms or the like which preclude their use in such applications.

Further embodiments of the invention should be apparent from the foregoing and the following recitation of the claims.

I claim:

1. An adjustable puller comprising:

a linkage head, having an axial threaded bore extending therethrough and containing generally coplaner clamp mounting platforms arranged at opposite sides of said bore;

an elongate screw member, threaded to mate with said axial threaded bore of said linkage head and be adjustably positioned therethrough;

first and second clamp members, arranged at opposite platforms of said linkage head and moveable in a common plane extending through about a center axis of said axial bore, toward and away from said center axis;

first and second elongate gripping jaws mounted at opposite sides of said linkage head, respectively enabled to move in a plane in common with a plane of said clamp members, toward and away from said center axis, said gripping jaws extending along said axis of said axial bore and having a plurality of gripping elements having engaging ends arranged along a plane in defined alignment angled from about 1 to about 10 degrees from parallel to said center axis of said bore, arranged for engaging a component to be pulled;

two sets of two opposing elongate linking members, pivotally mounted in spaced quadrilateral relationship among each clamp member and one of said gripping jaw and clamp mounting platform, and arranged to enable movement of said gripping jaw linearly along about said center axis of said axial bore in said common plane at a consistent defined angular relationship to the center axis.

2. A puller of claim 1 wherein said linking members are pivotally mounted between said clamping members and respective clamp mounting platforms, said clamp members comprise notch and slot means arranged for adjustably mounting a mating slot and shoulder of a gripping jaw along at least three sets of mating surfaces along planes which cross the centerline of said axial bore at an angle from about 70 to about 90 degrees, said gripping jaws comprising a plurality of gripping elements having engaging ends arranged along a plane in defined alignment angled to said center axis of said bore, wherein distal engaging ends are nearer said center axis than proximal engaging ends.

3. The puller of claim 2 wherein said plane of said ends of said elements is angled from about 1 to about 10 degrees from parallel to said centerline.

4. The puller of claim 3 wherein said plane of said ends of said elements is angled from about 1 to about 7 degrees from parallel to said centerline.

5. The puller of claim 4 comprising seven gripping elements on a gripping jaw.

6. The puller of claim 5 wherein said gripping elements are beveled from about 20 to about 50 degrees to form an edge at their end.

7. The puller of claim 3 wherein said means for pivotally mounting said linking members comprises pin means which extend through holes in said linking members and said clamp member.

8. The puller of claim 7 wherein said linking members, clamp members and linkage head are secured in a hinged parallelogram which maintains a longitudinal axis of a gripping jaw in essentially the same relative relationship with said axis of said axial bore during clamp member movement.

9. The puller of claim 2 wherein mounting engagement of said slots and shoulders is maintained by screw attachment means.

10. The puller of claim 2 wherein a forward surface of a gripping element is in a plane arranged about 1 to about 10 degrees from a perpendicular to said centerline.

11. The puller of claim 2 comprising means for resisting movement of said gripping jaw toward said center axis.

12. The puller of claim 11 wherein said means for resisting movement comprises a screw member arranged among said linkage head and a clamp member for adjustably maintaining a fixed distance between said linkage head and said clamp member.

13. A puller of claim 1 wherein said linking members are pivotally mounted between said clamping members and said gripping jaws and said clamping members are mounted to said clamp platform of said linkage head.

14. A puller of claim 13 wherein a clamping member is adjustably mounted to said platform for movement toward and away from said center axis.

15. A puller of claim 13 wherein said mounting platform comprises a slot configured to extend generally perpendicular from said axial bore, and said clamping member comprises a configuration which mates with said slot for slidably mounting said clamping member to said platform.

16. A puller of claim 15 wherein said slot is dove-tail configured and said clamping member comprises a mating configuration.

17. A puller of claim 14 comprising means for locking said clamp member in a desired position along said platform.

18. A puller of claim 15 wherein said clamping member comprises a mating configuration with said slot which enables forward and reverse directional fitting of said clamp member in said slot.

19. A puller of claim 18 wherein mounting of said clamp member in a first direction in a slot enables gripping by said gripping jaws in a direction toward the center axis, and reversed mounting of said clamp member enables gripping in a direction away from the center axis.

20. A puller of claim 18 wherein mounting clamp members of said puller in a first direction enables pulling a component from a shaft, and reversed mounting said clamp members enables pulling a component from a housing.

21. A puller of claim 13 wherein a first leg of said clamping member comprises a slot configured to engage a mounting platform of said linkage head, said first leg is mounted to extend generally perpendicular from said axial bore, and said elongate linking members are comprised between a second leg of said clamping member and said gripping jaw.

22. A puller of claim 21 wherein said first leg is mounted to said mounting platform by bolt means.

23. The puller of claim 11 wherein said means for resisting movement comprises a screw member.

24. The puller of claim 23 wherein said screw member is arranged among a clamp mounting platform and a clamp member for adjustabiy maintaining a fixed distance between said clamp mounting platform and said clamp member.

* * * * *